United States Patent
Thomas

(10) Patent No.: US 9,494,343 B2
(45) Date of Patent: Nov. 15, 2016

(54) SOLAR CAPTURE MOUNTING SYSTEMS AND METHODS

(75) Inventor: Rodney Harold Thomas, Town and Country, MO (US)

(73) Assignee: Rodney Harold Thomas, Town and Country, MO (US)

(*) Notice: Subject to any disclaimer, the term of this patent is extended or adjusted under 35 U.S.C. 154(b) by 340 days.

(21) Appl. No.: 12/831,806

(22) Filed: Jul. 7, 2010

(65) Prior Publication Data

US 2011/0005583 A1    Jan. 13, 2011

Related U.S. Application Data

(60) Provisional application No. 61/223,471, filed on Jul. 7, 2009.

(51) Int. Cl.
| | |
|---|---|
| H01L 31/02 | (2006.01) |
| F24J 2/52 | (2006.01) |
| H01L 31/042 | (2014.01) |
| H02S 30/20 | (2014.01) |
| H02S 40/38 | (2014.01) |

(Continued)

(52) U.S. Cl.
CPC ............ *F24J 2/5241* (2013.01); *F24J 2/523* (2013.01); *H02S 20/00* (2013.01); *H02S 20/10* (2014.12); *H02S 20/22* (2014.12); *H02S 20/26* (2014.12); *H02S 30/20* (2014.12); *H02S 40/38* (2014.12); *F24J 2/4638* (2013.01); *Y02B 10/20* (2013.01); *Y02E 10/47* (2013.01); *Y02E 10/50* (2013.01); *Y10T 29/49826* (2015.01)

(58) Field of Classification Search
CPC ............ H01L 31/0422; H01L 31/0487; H01L 31/0488; H01L 31/045; H01L 31/0424
USPC .......................................... 136/244; 57/173.3
See application file for complete search history.

(56) References Cited

U.S. PATENT DOCUMENTS 2,280,526 A * 4/1942 Johnson .................. 211/119.16
3,255,047 A    6/1966 Escofferey
(Continued)

FOREIGN PATENT DOCUMENTS

WO        02101839 A1    12/2002
WO    WO 2010011649 A1 *  1/2010

OTHER PUBLICATIONS

Uni-Solar, "Installation Manual for PVL on Membrane: A Building Integrated Photovoltaic Flat Roof Solution Using TPO and EPDM Membrane Roofing Systems" Brochure, admitted prior art, 25 pages.

(Continued)

*Primary Examiner* — Marla D McConnell
*Assistant Examiner* — Sadie White
(74) *Attorney, Agent, or Firm* — Lathrop & Gage LLP

(57) ABSTRACT

A partially non-rigid solar capture mounting system which reduces the risk of damage due to wind is disclosed. The solar capture mounting system includes at least one pole, a horizontal beam mounted to the pole, and at least one backing plate hanging from the horizontal beam via a pivotal connection. Examples of pivotal connection are bushings with ball bearings, hinges, steel rings and spring clips. Each of the backing plates supports at least one solar cell. Wind pressure against a backing plate pivots the backing plate about the horizontal beam such that the system experiences reduced stress and reduced risk of damage due to wind and wind carried objects.

23 Claims, 9 Drawing Sheets

(51) Int. Cl.
*H02S 20/10* (2014.01)
*H02S 20/26* (2014.01)
*H02S 20/22* (2014.01)
*F24J 2/46* (2006.01)

(56) References Cited

U.S. PATENT DOCUMENTS

| | | | | |
|---|---|---|---|---|
| 3,637,210 | A * | 1/1972 | Brantley | A63B 69/345 |
| | | | | 212/296 |
| 3,985,090 | A * | 10/1976 | Rineman | 114/39.26 |
| 4,502,092 | A * | 2/1985 | Bannink et al. | 361/218 |
| 4,832,001 | A * | 5/1989 | Baer | 126/579 |
| 4,968,355 | A * | 11/1990 | Johnson | 136/246 |
| 5,131,341 | A * | 7/1992 | Newman | 114/39.21 |
| 5,143,556 | A * | 9/1992 | Matlin | 136/244 |
| 5,741,370 | A * | 4/1998 | Hanoka | 136/251 |
| 6,093,884 | A * | 7/2000 | Toyomura et al. | 136/244 |
| 2001/0037756 | A1* | 11/2001 | Fink | 114/102.1 |
| 2003/0070708 | A1* | 4/2003 | Stuart et al. | 136/291 |
| 2005/0035244 | A1* | 2/2005 | Conger | F24J 2/5241 |
| | | | | 248/49 |
| 2005/0084338 | A1* | 4/2005 | Skeels | E02D 27/52 |
| | | | | 405/226 |
| 2006/0225781 | A1* | 10/2006 | Locher | 136/245 |
| 2008/0190476 | A1* | 8/2008 | Baruh | 136/245 |
| 2009/0114262 | A1* | 5/2009 | Adriani | B23K 1/0008 |
| | | | | 136/244 |
| 2009/0120016 | A1* | 5/2009 | Hon | 52/173.3 |
| 2010/0077592 | A1* | 4/2010 | Casano | 29/434 |

OTHER PUBLICATIONS

Helmke, Claas, "Third Generation BIPV Standard Building Elements With Integrated Photovoltaic," Brochure, admitted prior art, 4 pages.

Van Cleef, M, et al., "Superior Energy Yields of UNI-SOLAR® Triple Junction Thin Film Silicon Solar Cells Compared to Crystalline Silicon Solar Cells Under Real Outdoor Conditions in Western Europe," Presented at 17th European Photovoltaic Solar Energy Conference and Exhibition, Oct. 22-26, 2001, 4 pages.

Gregg, Allan, et al., "A Real World Examination of PV Systems Design and Performance," Presented at the 31st Institute of Electrical and Electronics Engineers, Photovoltaic Specialist Conference and Exhibition, Jan. 3-7, 2005, 6 pages.

Gregg, Allan, et al., "Performance Analysis of Large Scale, Amorphous Silicon Photovoltaic Power Systems," Presented at the 31st Institute of Electrical and Electronics Engineers, Photovoltaic Specialist Conference and Exhibition, Jan. 3-7, 2005, 5 pages.

Fraunhofer Institute for Solar Energy Systems, "Photovoltaics in Buildings a Design Handbook for Architects and Engineers," International Energy Agency, admitted prior art, 282 pages.

* cited by examiner

SOLAR CAPTURE MOUNTING SYSTEMS AND METHODS

RELATED APPLICATIONS

This application claims priority to U.S. Provisional Application Ser. No. 61/223,471 (hereinafter "'471 provisional"), filed Jul. 7, 2009, the disclosure of which is incorporated herein by reference.

BACKGROUND

Photovoltaic panel systems (solar panel systems, etc.) are typically rigidly mounted on structures that hold the panels at a constant angle relative to the earth, such that the varying position of the sun relative to the earth provides optimal operation of the panels throughout the year. While some solar panel systems move to track the sun, the majority are stationary. Solar collector arrays can be ground mounted or roof mounted, often on a racking or holding system in close proximity to the ground or roof. Ground mounted arrays often require a large footprint while being subject to shading, soiling and, in some locales, seasonal snow cover. Roof mounted arrays utilize readily available space but may not be oriented to the ideal compass bearing to allow for maximum sunlight exposure. Another disadvantage of roof mounted arrays is that damage may occur to roofs during the installation and servicing of solar collectors. Roof mounted arrays are also often subject to shading, soiling or snow cover. In both ground and roof mounted systems, the cost of the rigid mount may form a significant part of the overall cost.

SUMMARY OF THE INVENTION

A solar capture mounting system that overcomes the drawbacks stated above is needed, and a solution is provided by the solar capture mounting system disclosed herein.

In an embodiment, the present solar capture mounting system is formed of at least one pole, one or more horizontal beam mounted to the pole, and at least one backing plate hanging from the one or more horizontal beams. Each backing plate supports at least one solar cell such that wind pressure pivotally moves the backing plate, and its associated solar cell, about the horizontal beam thereby reducing the risk of damage, e.g., due to wind.

In addition, the solar capture mounting system may further include electrically conductive components for connecting the solar cell to one or more of an energy processing component and an energy storage component. Also, the mounting system described above may be fabricated, at least in part, from tubes, I-beams, extrusions, rods and taut cables.

Mounting solar cells to the solar capture mounting system, an installer positions a first pole and a second pole substantially vertical and spaced apart such that a plane formed between the first and second poles is substantially perpendicular to a direction for solar radiation harvesting. Then an installer positions at least one horizontal support beam from the first pole to the second pole. Next, an installer suspends at least one backing plate from the horizontal support and if not already attached, attaches at least one solar cell to each of the at least one backing plate.

DETAILED DESCRIPTION OF THE DRAWINGS

Figure 1:
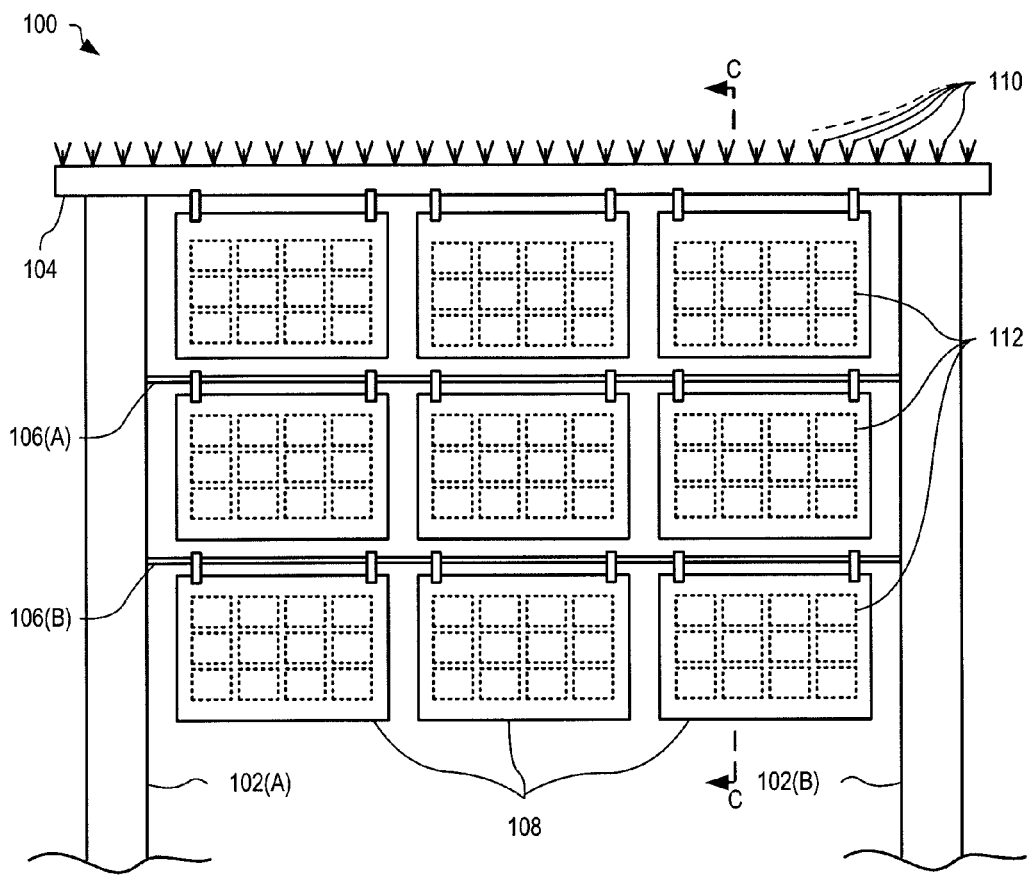
FIG. 1 shows one exemplary solar capture mounting system, in an embodiment.

A solar capture mounting system enables commercially available solar collector materials to be efficiently mounted for use in close proximity to where electricity is consumed, such as residential and commercial buildings. It is likely that many small solutions will be needed to achieve more globally sustainable energy generation. On-site energy generation and conservation techniques will play a major role in this critical change in energy generation and consumption. Many less developed areas of the world may never have large central energy generation and distribution systems installed, but rather rely on locally produced sources of renewable energy. While it may be difficult to envision large solar capture mounting systems distributed across the landscape, the presence of these systems may be comparable, in certain respects, to the telephone poles and electric poles that have become ubiquitous in many developed areas of the world over the past one hundred fifty years. In fact, the use of localized solar capture mounting systems to economically position solar generation capability may eventually make many of these electrical poles unnecessary. For instance, thermovoltaic materials are under development that may allow heat to be converted directly into electricity.

Solar collector technology (conversion of sunlight into electricity) is rapidly evolving. The two primary types of solar collectors used for electrical generation at the present time are those that convert sunlight directly into electricity, often referred to as photovoltaic; and, those that reflect sunlight to a focal point to generate heat, which may then be used to generate electricity. The disclosed solar capture mounting systems and methods are intended for use with solar collectors that convert sunlight directly into electricity, although its use may be adaptable to new types of solar collectors developed in the future.

Among the conditions considered when deploying a solar capture mounting system are prevailing weather conditions, the size of the solar collector array, the costs of component materials, ease of assembly with the available workforce, effects of altering sunlight patterns on surrounding areas, regulatory considerations and other factors. These factors may vary widely in different parts of the world, and may have different weighting in these different parts of the world.

The solar capture mounting systems and methods disclosed herein allow a solar collector array to be raised above surrounding obstacles for enhanced sunlight exposure. The solar collector array may often be faced to the ideal compass bearing for sunlight exposure in a given locale. Shading, soiling and seasonal snow cover are greatly reduced or eliminated by the movement of the solar collectors. The solar capture mounting system allows the solar collection array to be constructed so that birds find it difficult to perch or nest on the array.

In real world applications, a complete solar collector to electrical consumption system has numerous factors affecting its operating efficiency, many of which are outside the scope of this disclosure. Examples of these factors include solar collector array size, wiring size, distribution losses and inverter efficiency. Obviously, these factors and others need to be carefully evaluated for each system design and installation.

The solar capture mounting systems disclosed herein may include vertical structural member(s) in the form of one or more supporting masts, and one or more horizontal beams. The vertical and horizontal components may be custom manufactured or constructed from a variety of commercially available structural materials. In some applications, the superstructure may be reinforced with diagonal ground ties (guy ropes) to help it remain upright. The height of the vertical components (i.e., masts and/or poles) is determined based on site conditions and requirements.

Attached to the superstructure is a suspension system to which solar collectors are attached. The suspension system may be constructed from a variety of materials, including for example rods, cables, ropes, chains or extrusions. The suspension system (hereinafter also identified as additional horizontal beams) may be attached to the superstructure with a variety of attachment methods, the exact method depending on the types of materials utilized for the construction of the superstructure and the suspension system. Methods of attachment include, for example, such fastening methods as mechanical fastening, welded connections, insertion through the masts and other methods.

The solar capture mounting systems may be designed based upon the solar collectors being used. The height, width and thickness of individual solar collector components may determine the components used within the solar capture mounting system. For example, if heavy or boxy solar collectors are to be used, a heavy-duty and relatively expensive superstructure may be required to support the weight of the suspension system and solar collectors.

The solar capture mounting systems and methods disclosed herein preferably support thin solar collecting (photovoltaic) films or surfaces affixed to one side of light weight solar collector substrates (backing plates) comprised of thin sheets of plastic, sheet metal or other materials. An example of such a commercially available thin film solar collecting material is amorphous silicon alloy (which may be protected with polymer encapsulation), which can be easily laminated to sheet metal substrates. Backing plates may be designed to support one or more such thin film solar collectors.

Solar collectors are attached to the suspension system of the solar capture mounting systems in a manner that permits the system to withstand adverse weather and climatic conditions. In high wind conditions, a superstructure and suspension system with solar collectors set in fixed positions is subject to great wind loads leading to the possibility that components may tear, bend, break or topple. A key feature of the solar capture mounting systems disclosed herein is that wind stress on the solar collector array is reduced by suspending the light weight solar collectors from low-friction attachment devices that allow panels to move in the direction of the wind. The solar collectors are comparable to hinged louvers that can easily swing in the direction of wind to lessen wind resistance on the solar capture mounting system. As wind abates, the solar collectors return to a vertically suspended position through gravitational force.

The suspension system may include bushings with ball bearings adjacent to the solar collectors/backing plates to ensure that the individual solar collector components have the ability to swing with low friction for long periods of time. The solar collectors/backing plates are also preferably mounted such that they do not rub against one another.

The solar collectors may be wired in series and in parallel to provide electricity to a consumer (e.g., a local structure) where the electricity is converted into a usable form and used to power electrical equipment. For example, direct current (DC) electricity generated by the solar collectors is converted into alternating current (AC) electricity at a desired frequency (e.g., 50 hertz) and voltage (e.g., 110 volts) as required by consumer electronics and appliances. One or more inverters or a plurality of microinverters (e.g., one microinverter per solar panel) may be utilized in the conversion from DC electricity to AC electricity. Optionally, excess electricity may be stored (e.g., within a battery or other electrical storage device) for use when the solar collectors are not operational (e.g., at night).

The most effective orientation for solar collectors is determined by a combination of compass bearing and solar collector tilt angle. Ideal orientation varies with geographic location. At any geographic location, the ideal orientation changes throughout the day with the position of the sun. Certain solar collector mounts move to track the sun, while others are stationary and oriented for the most effective average solar exposure on an annual basis.

A stationary solar capture mounting system may be oriented to a compass bearing that maximizes sunlight exposure on an annual basis. The ideal tilt angle for solar collectors is perpendicular to the angle of the sun (or a angle to achieve optimum solar harvesting), and thus a vertically hanging solar collector may not be optimal. However, certain modern photovoltaic surfaces are not as affected by tilt angle as traditional crystalline silicon collector materials; thus the efficiency of the solar collectors may be economically viable. These vertically hanging panels are most efficient at extreme northern and southern latitudes.

Optionally, solar capture mounting systems and methods may provide tilt to the solar collectors, through the use of one or more springs, one or more counter-balances, etc., to the backing plates and/or solar collectors mounted thereon, to improve efficiency.

The solar capture mounting systems and methods disclosed herein use inexpensive materials that are easily assembled. Their small footprints allows for location flexibility, while its masts/poles may be anchored to the ground and/or to structures (e.g., roofs).

The variable height of the solar capture mounting systems permits solar collectors to be raised above sources of sunlight interference for access to the most direct and unobstructed sunlight. Such positioning also results in frequent wind motion of the backing plates and/or solar collectors that tend to shed soil and snow from the solar collectors, thereby maintaining efficiency of their operation. As shown below, prevention of soiling by birds may be incorporated into the design of the solar capture mounting systems.

Variable spacing of solar collectors or backing plates facilitates control of the amount of sunlight penetrating the array. For example, increased spacing between solar collector/backing plate components allows more sunlight to penetrate the solar collector array, thereby allowing the amount of sunlight blocked from surrounding areas to be selected during construction. For example, where vegetation exists in the shadow pattern of the solar collector array, it may be desirable to not block the sunlight entirely.

Solar collectors attached to the solar capture mounting systems disclosed herein may be easily and inexpensively replaced for maintenance purposes or to substitute more efficient solar collectors as technology improves. The solar capture mounting system also positions the solar collectors far enough from the ground to lessen the possibility of vandalism or interference by unauthorized personnel.

FIG. 1 shows one exemplary solar capture mounting system 100. System 100 includes two poles 102(A) and 102(B), a top horizontal beam 104, two additional horizontal beams 106(A) and 106(B) and a plurality of backing plates 108 that are hanging from top horizontal beam 104, and additional horizontal beams 106(A) and 106(B). As shown, top horizontal beam 104 is supported at, or near, the top of poles 102 and is substantially horizontal. Across a top surface of top horizontal beam 104, a plurality of bird repellant devices 110 are mounted to prevent birds from landing on, or nesting on, top horizontal beam 104. Each backing plate 108 may support one or more solar collectors 112 of the type that convert sunlight into electrical energy.

Poles 102 may be made of one or more of wood (e.g., telephone poles), plastic (e.g., tubing, solid, multi-faceted), metal (e.g., tubing that is round or multi-faceted), and carbon-fiber (e.g., as a tube or multi-faceted construction). In an embodiment, poles 102 are 18" diameter telegraph poles. As described below, poles 102 may be mounted by partial burial in the ground, with or without concrete (or other such material) for support, and/or supported by guy wires. Top horizontal beam 104 may be made from one or more of wood, plastic, carbon fiber and metal. Top horizontal beam 104 may have an "I" cross section, a rectangular cross section, and may be hollow. In one example, top horizontal beam 104 is a carbon-fiber "I" beam that offers the combination of light weight and strength. Where top horizontal beam 104 is hollow, end caps may be included. Further, top horizontal beam 104 may also provide encapsulation of electrical busses and connectors. Top horizontal beam 104 may be formed with one or more holes to allow backing plates 108 to be hung therefrom.

Figure 12:
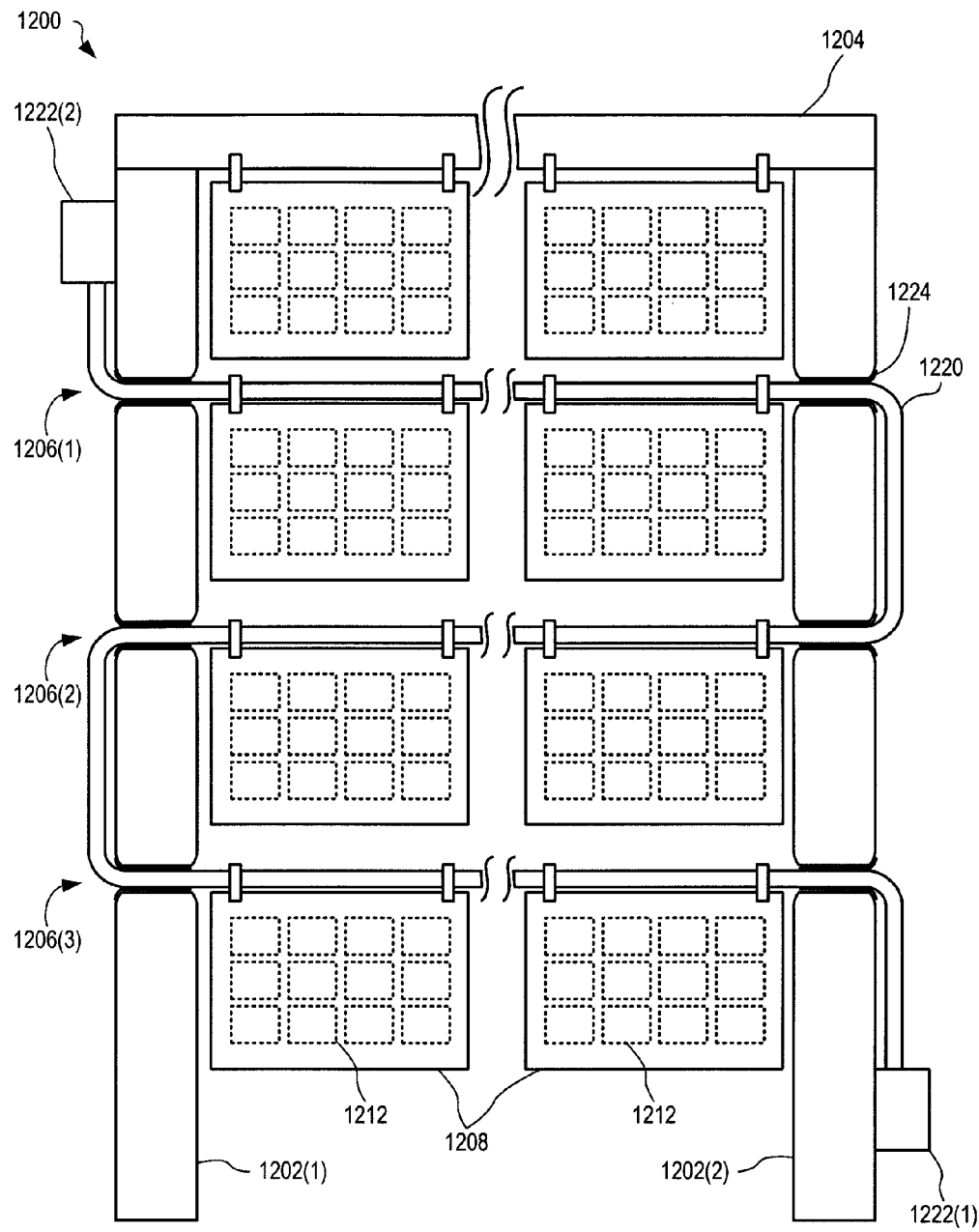
FIG. 12 shows one exemplary solar capture mounting system configured with a cable system for providing horizontal beams, in an embodiment.

Additional horizontal beams 106 may be made of one or more of wood, plastic, carbon fiber, and metal. In one example, as shown in FIG. 12, additional horizontal beams 106 are formed by a taut cable between poles 102. In another embodiment, additional horizontal beams 106 are metal rods that are supported and held by holes drilled into poles 102 at appropriate heights. Where additional horizontal beams 106 are rods or tubes (e.g., of plastic and/or metal) they may be supported by one or more supports (e.g., hooks or eyelets) attached to poles 102. Where required, additional horizontal beams similar to top horizontal beam 104, may be included to provide additional rigidity.

Backing plates 108 may be formed of one or more of metal, plastic, carbon-fiber, and other similar material. Backing plates 108 may be formed from sheet material, molded and/or extruded. In one embodiment, backing plates 1078 are at least partially formed as a mesh to reduce weight thereof. Bird repellant devices 110 may be formed as a continuous strip or as individual units that are attached to the top surface of top horizontal beam 104. Bird repellant devices 110 may represent any type of device or product that prevents birds from sitting and nesting on top horizontal beam 104. Bird repellant devices 110 may be applied to other positions of system 100 without departing from the scope hereof.

System 100 may be oriented such that solar collectors 112 face an optimal direction for harvesting solar radiation throughout the year. For example, system 100 may be oriented to mount solar collectors 112 to face in a southerly direction in the northern hemisphere, and system 100 may be oriented to mount solar collectors 112 to face in a northerly direction in the southern hemisphere. As known in solar harvesting technology, the optimal direction for solar harvesting is based upon location on the earth's surface.

Although shown with nine backing plates 108 in a three row by three column format, system 100 may include more or fewer rows, more or fewer columns, without departing from the scope hereof.

Figure 2:
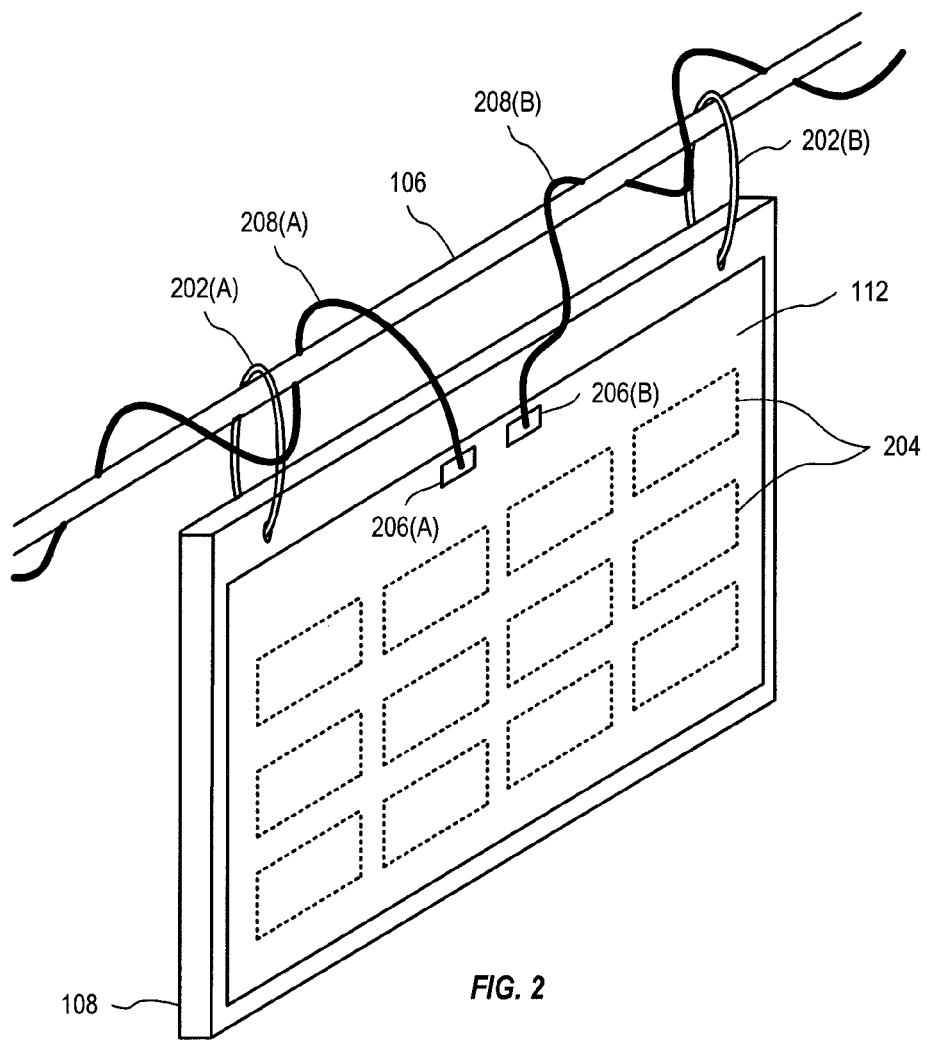
FIG. 2 shows one exemplary backing plate hanging, by two exemplary string clips, from a horizontal beam of the solar capture mounting system of FIG. 1.
Figure 3:
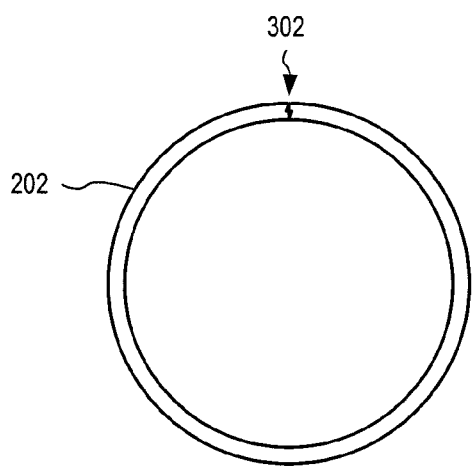
FIG. 3 shows one exemplary spring clip of FIG. 2 in further detail.

FIG. 2 shows one exemplary backing plate 108 hanging from horizontal beam 106 of system 100, FIG. 1. In this example, two spring clips 202(A) and 202(B) are used to hang backing plate 108 from horizontal beam 106; each spring clip passing around horizontal beam 106 and through a hole in backing plate 108. FIG. 3 shows spring clip 202 in further detail, and illustrates how spring clip 202 may be opened at catch 302 to allow backing plate 108 to be hanged from horizontal beam 106. In a separate embodiment (not shown) the backing plate hangs from the horizontal beam by steel rings; each steel ring passing around the horizontal beam and through a hole in the backing plate.

As shown in FIG. 2, solar collector 112 has a plurality of solar cells 204 and two electrical contacts 206(A) and 206(B) that attach to power leads 208(A) and 208(B) respectively. In one example, contacts 206 may each include a weather proof detachable connector for connecting to leads 208. In another embodiment, leads 208 may be permanently attached to solar collector 112 at contacts 206. In yet another embodiment, solar collector 112 includes electronics or embedded electronics, for example, one or more microinverters, Maximum Power Point Tracking (MPPT) components, DC to DC converters, power optimizers, etc. Backing plate 108 and solar collector 112 hang vertically from horizontal beam 106 and may pivot at least partially around beam 106 when blown by prevailing winds.

Figure 4:
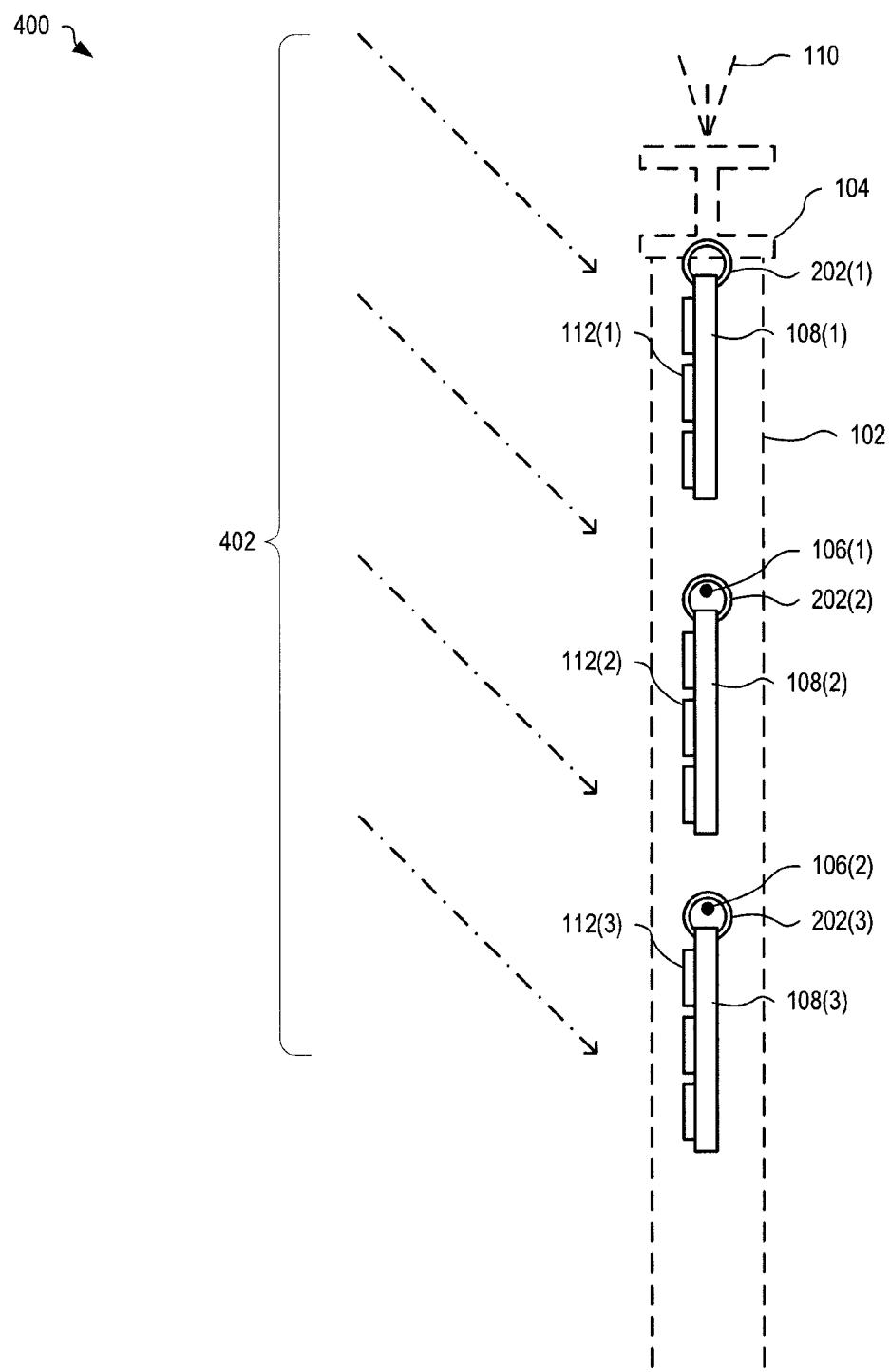
FIG. 4 shows a cross-section through plane C-C of the solar capture mounting system of FIG. 1.

FIG. 4 shows a cross-section 400 through plane C-C of solar capture mounting system 100 of FIG. 1. Cross-section 400 shows three backing plates 108(1), 108(2) and 108(3) hanging, via spring clips 202(1), 202(2) and 202(3), from horizontal beams 104, 106(1) and 106(2), respectively. Incident solar energy 402 causes solar collectors 112(1), 112(2) and 112(3) to generate electricity.

Figure 5:
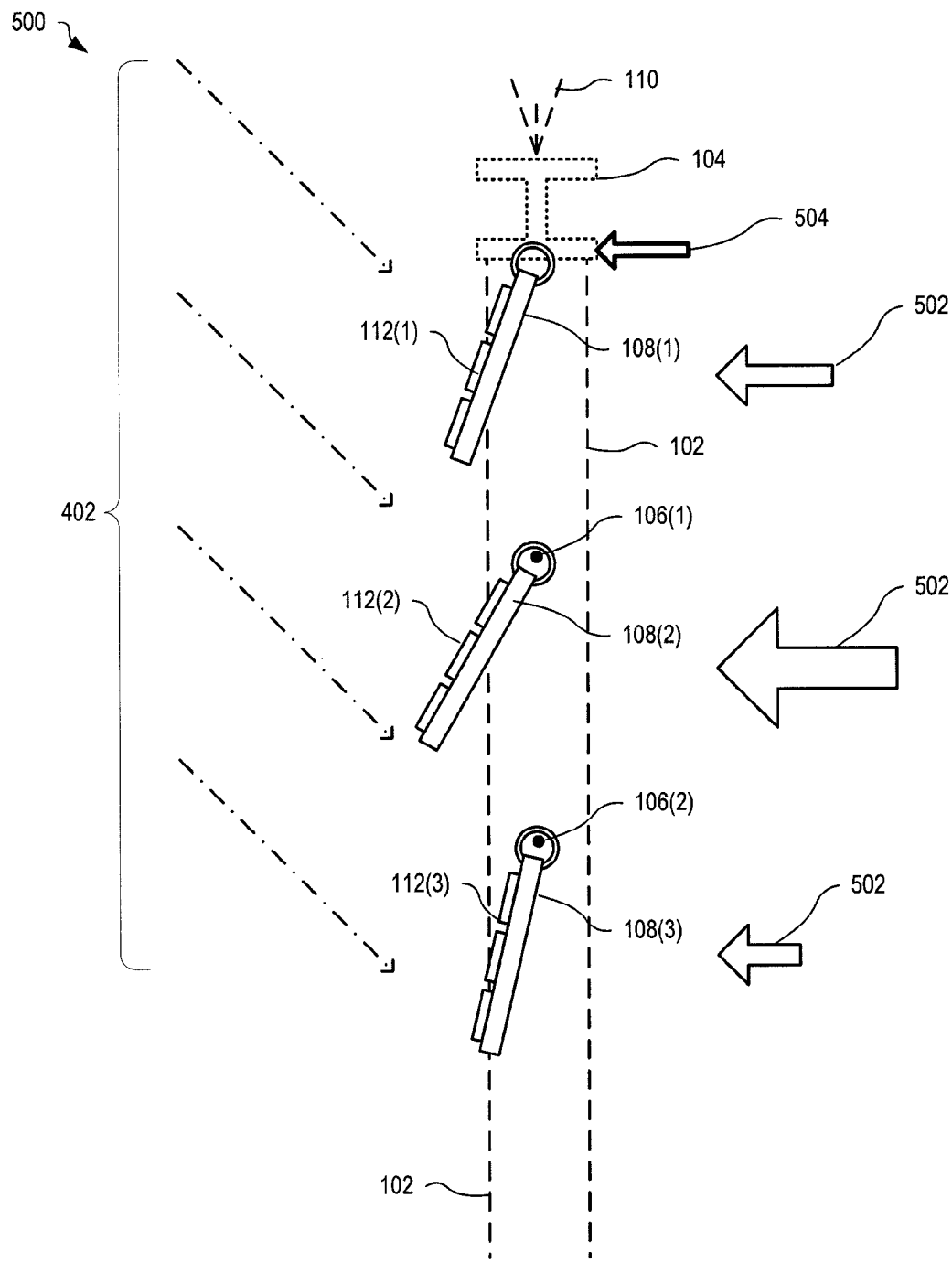
FIG. 5 shows a cross-section through plane C-C of the solar capture mounting system of FIG. 1 depicting deflection of the backing plates due to prevailing winds.

FIG. 5 shows a cross-section 500 through plane C-C of solar capture mounting system 100 of FIG. 1 depicting exemplary deflection of backing plates 108 due to prevailing wind 502. Prevailing wind 502 imparts a force onto backing plates 108(1), 108(2) and 108(3), causing them to deflect around horizontal beams 104, 106(1) and 106(2), respectively, as shown. The deflection of backing plates 108 is based upon the strength of the prevailing wind 502 striking the backing plate. A force 504 is imparted onto system 100 as a result of prevailing wind 502. However, force 504 is significantly smaller that would be imparted onto system 100 were backing plates 108 mounted rigidly to horizontal beams 104, 106 and poles 102.

Figure 6:
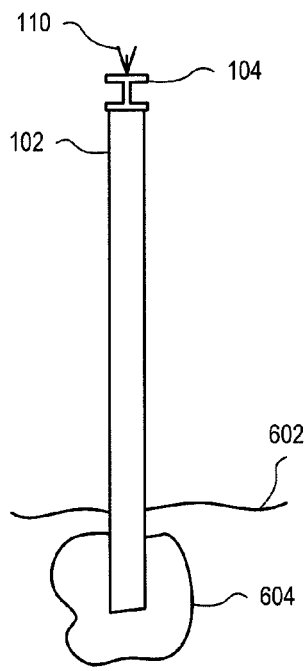
FIG. 6 shows exemplary mounting for the poles of the solar capture mounting system of FIG. 1.
Figure 7:
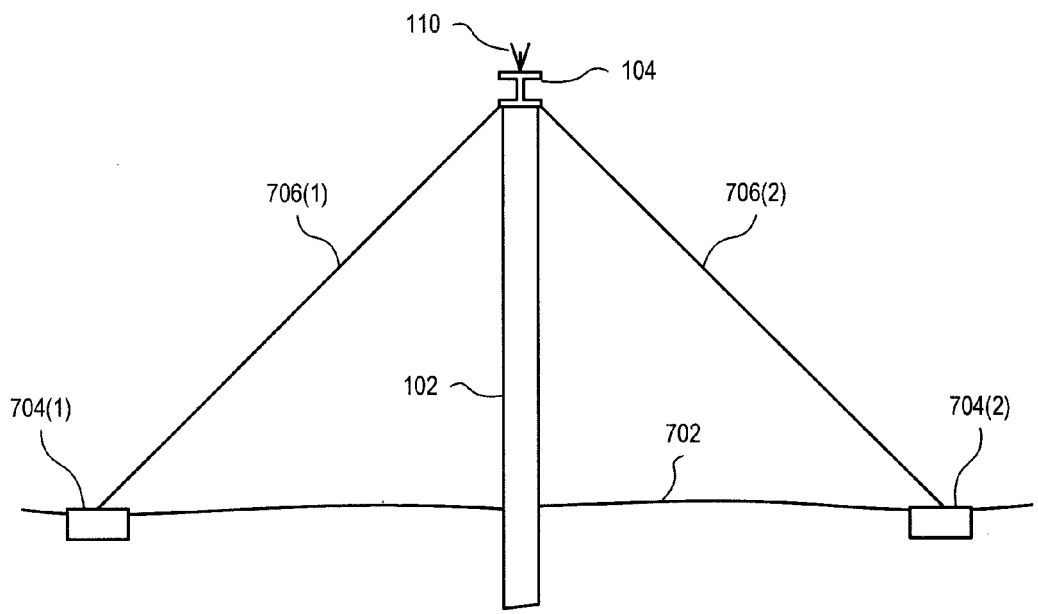
FIG. 7 shows alternate exemplary mounting for the poles of the solar capture mounting system of FIG. 1.

FIG. 6 shows one exemplary mounting method for each pole 102 of the solar capture mounting system 100 of FIG. 1. In particular, pole 102 is inserted into the ground 602 and secured with concrete ballast 604. FIG. 7 shows an alternate exemplary mounting method for poles 102 of the solar capture mounting system 100 of FIG. 1. Pole 102 is positioned into ground 702 and supported by two (or more) guy ropes 706(1) and 706(2) that connect near the top of pole 102 and secure to anchor points 704(1) and 704(2), respectively.

Figure 8:
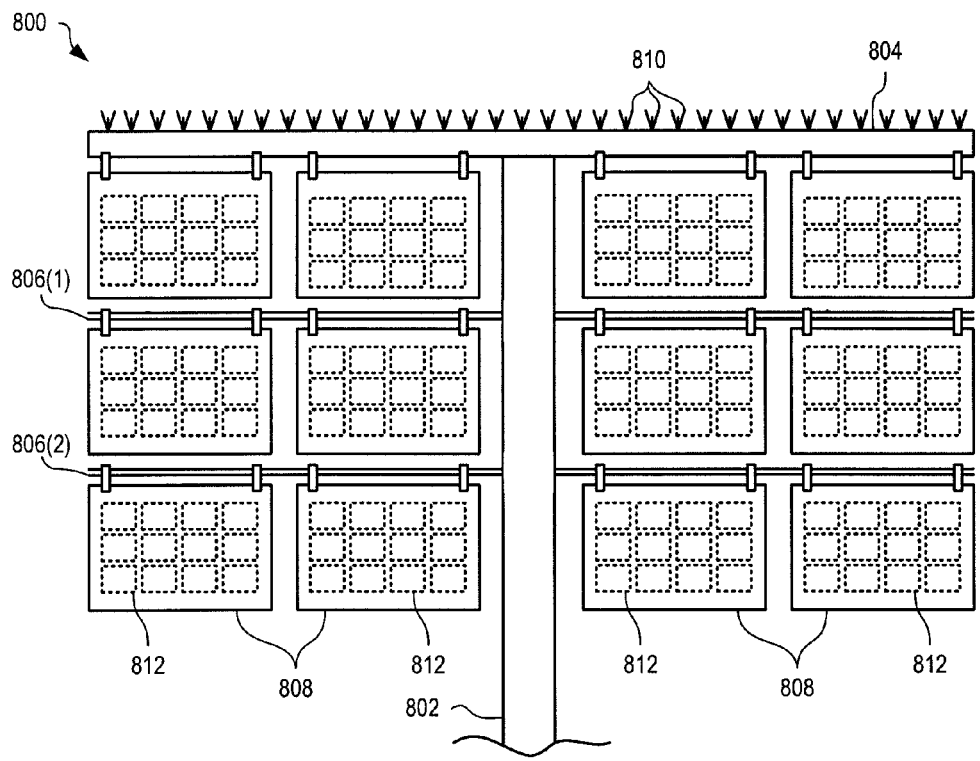
FIG. 8 shows one exemplary solar capture mounting system that includes a single pole supporting a top horizontal beam, two additional horizontal beams, and a plurality of backing pates, each supporting one or more solar collectors, in an embodiment.

FIG. 8 shows one exemplary solar capture mounting system 800 that includes a single pole 802, a horizontal beam 804, two additional horizontal beams 806(1) and 806(2), and a plurality of backing pates 808, each supporting one or more solar collectors 812. System 800 also includes a plurality of bird repellant devices 810 mounted on top of horizontal beam 804.

Figure 9:
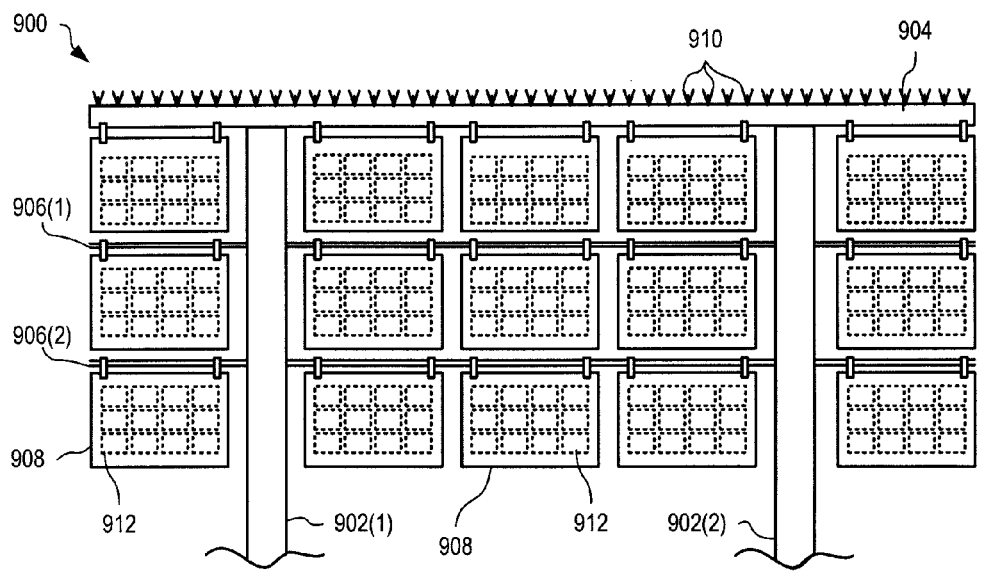
FIG. 9 shows one exemplary extended solar capture mounting system that includes two poles, a top horizontal beam, two additional horizontal beams, and a plurality of backing pates, each supporting one or more solar collectors, in an embodiment.

FIG. 9 shows one exemplary extended solar capture mounting system 900 that includes poles 902(1) and 902(2), a top horizontal beam 904, two additional horizontal beams 906(1) and 906(2), and a plurality of backing plates 908, each supporting one or more solar collectors 912. Horizontal beams 904, 906 are supported by poles 902 and extend beyond each pole 902 to carry additional backing plates 908, thereby increasing the effective area of system 900. System 900 also includes a plurality of bird repellant devices 910 mounted on top of horizontal beam 904.

Figure 10:
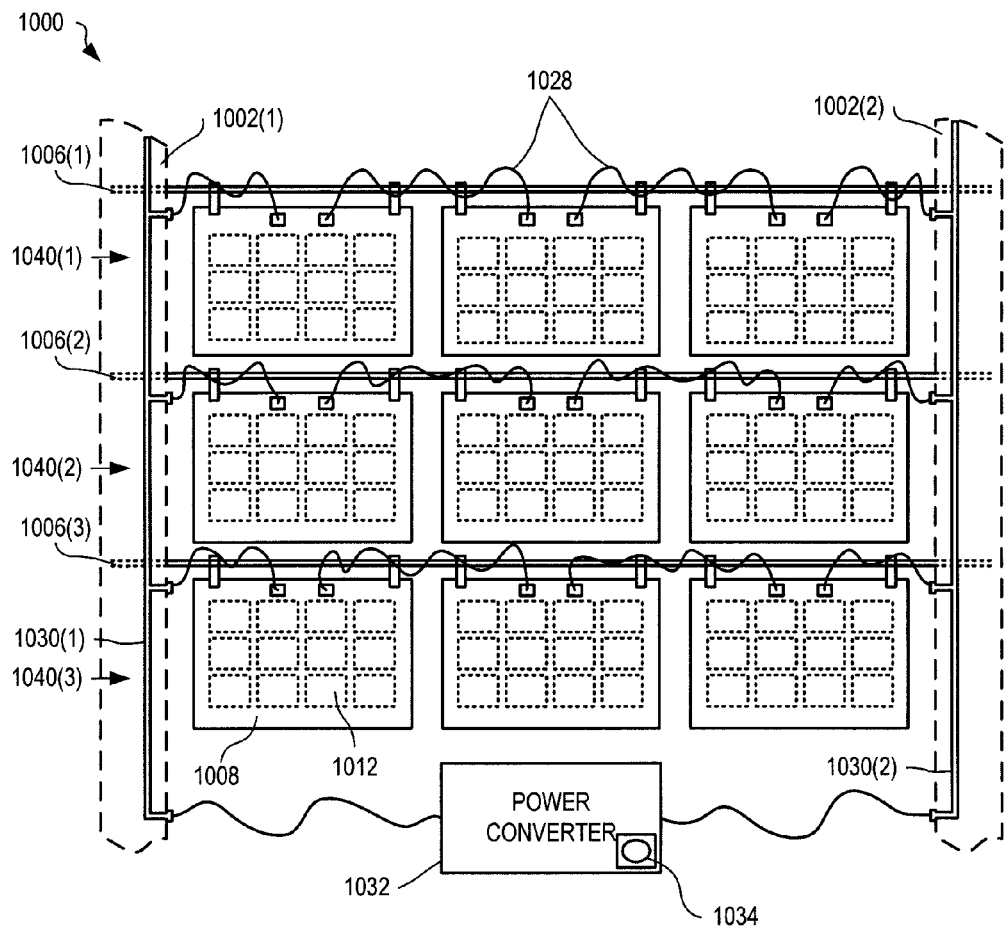
FIG. 10 shows a portion of one exemplary solar capture mounting system illustrating support for electrical connectivity between solar collectors, attached to backing plates, and a power converter unit.

FIG. 10 shows a portion 1000 of one exemplary solar capture mounting system illustrating support for electrical connectivity between solar collectors 1012, attached to backing plates 1008, and a power converter and/or storage unit 1032. In one embodiment, a first (e.g., positive) electrical bus 1030(1) is formed within or on the surface of first pole 1002(1) and a second (e.g., negative) electrical bus 1030(2) is formed within or on the surface of second pole 1002(2). Within each row 1040, solar collectors 1012 of each backing plate 1008 are connected, using cables 1028, in series with other solar collectors 1012 of other backing plates 1008, and the solar collector at each end of the row connects with the electrical bus 1030. In this example, since solar collectors 1012 within each row 1040 connect in series between electrical bus 1030(1) and electrical bus 1030(2), and each row 1040 connects in parallel, electrical busses 1030(1) and 1030(2) may connect to a power converter and/or storage unit 1032 that provides conditioned electricity to a consumer (not shown). Electrical busses 1030 and cables 1028 may be weather proof and include connectors for facilitating onsite connection of solar collectors 1012, electrical busses 1030, cables 1028 and power converter and/or storage unit 1032. Power converter 1032 is shown with an exemplary output 1034 for providing power to one or more consumers. Optionally, solar collectors 1012 or backing plates 1008 may include electronics or embedded electronics (not shown), for example, Maximum Power Point Tracking (MPPT) components, DC to DC converters, power optimizers, or an inverter portion of power converter 1032. In one example, the inverter portion of power converter 1032 is formed as plurality of microinverters, for example, one microinverter per panel/solar collector with each microinverter configured with a panel/solar collector.

In an alternate embodiment, horizontal beams 1006 may include electrical connectivity to facilitate connection of solar collectors 1012.

Figure 11:
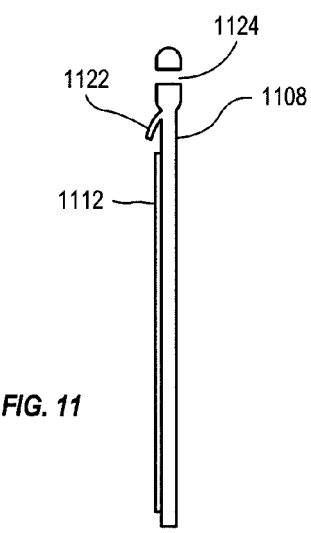
FIG. 11 is a cross-section through one exemplary backing plate illustrating a shield, a mounting hole and an attached solar collector.

FIG. 11 is a cross-section through one exemplary backing plate 1108 illustrating an optional shield 1122, a mounting hole 1124 and an attached solar collector 1112. Backing plate 1108 may represent one or more of backing plates 108 of FIG. 1, 808 of FIG. 8, 908 of FIG. 9, and 1008 of FIG. 10. When included, shield 1122 functions to prevent debris buildup on solar collectors 1112 without causing shadow on solar collector 1112. In an embodiment, backing plate 1108 is plastic and formed by extrusion, wherein backing plate 1108 may be cut to length when solar collector 1112 is applied, and holes 1124 drilled for hanging when installed. In another embodiment, backing plate 1108 if formed of extruded aluminum. In another embodiment, backing plate 1108 is formed as a mesh to reduce weight.

FIG. 12 shows one exemplary solar capture mounting system 1200 configured with a cable system for providing horizontal beams 1206. System 1200 includes two poles 1202(1) and 1202(2) that are spaced apart and mounted substantially vertical, a top horizontal beam 1204 that is supported across the top of each pole 1202, and a cable 1220 that is supported by poles 1202 to form additional horizontal beams 1206(1), 1206(2) and 1206(3), in this example. Cable 1220 may represent one or more of a steel cable, a nylon rope, and a chain. In the example of FIG. 12, poles 1202 are made of wood (e.g., telegraph poles) and have horizontal holes drilled through at locations for horizontal beams 1206 and cable guides 1224 inserted into the holes to allow cable 1220 to move freely through the holes. Cable 1220 is threaded through the holes and cable guides 1224 as shown and may be secured at both ends using a cable securing device 1222(1) and 1222(2). In one embodiment, each securing device 1222 represents a spring mechanism to maintain tension on cable 1220 such that horizontal beams 1206 are substantially straight. In an alternate embodiment, cable securing device 1222(2) does not include tensioning and simply secures cable 1220 to pole 1202(1), allowing cable securing device 1222(1) to apply tension to cable 1220.

A plurality of backing plates 1208 hang from top horizontal beam 1204 and additional horizontal beams 1206, and each supports one or more solar collectors 1212. Each backing plate 1208 may pivot under wind pressure around horizontal beams 1204, 1206.

Figure 13:
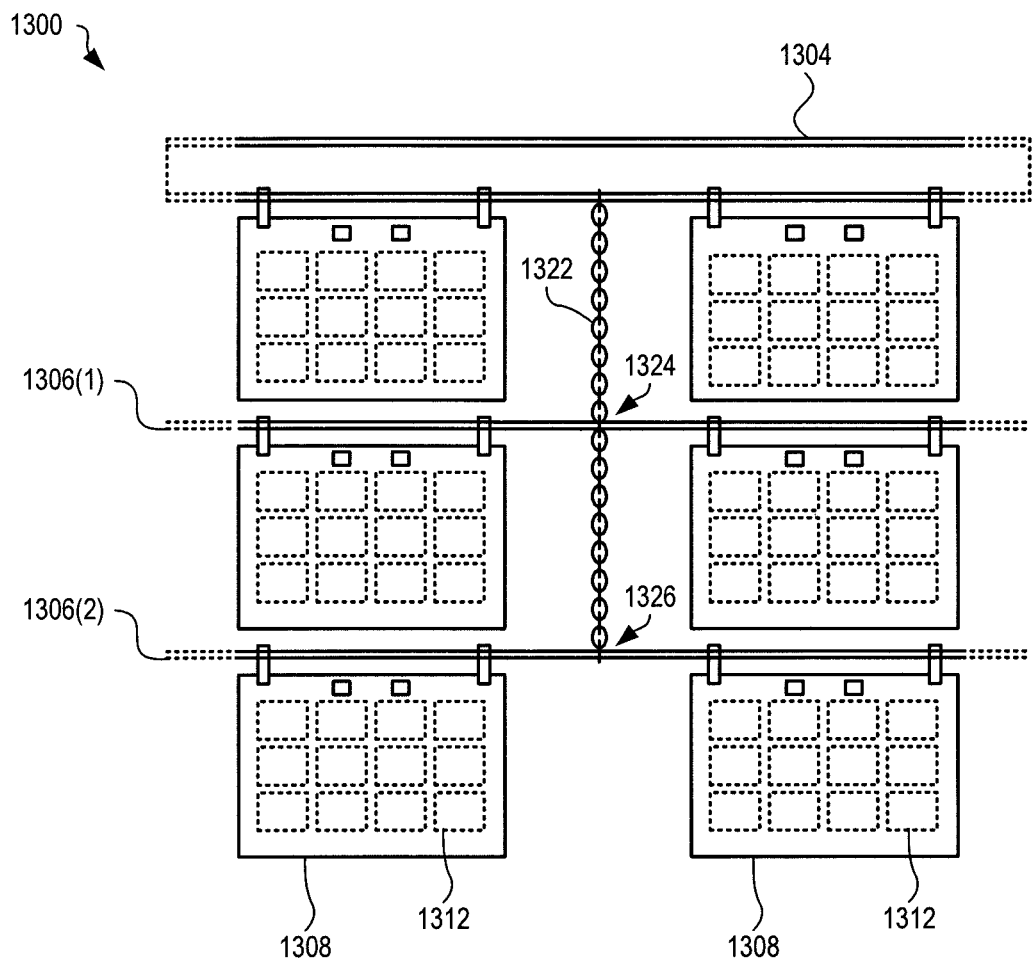
FIG. 13 shows a portion of an exemplary solar capture mounting system illustrating the use of optional vertical support to additional horizontal beams from a top horizontal beam.

FIG. 13 shows a portion 1300 of an exemplary solar capture mounting system illustrating the use of optional vertical support 1322 to additional horizontal beams 1306 from top horizontal beam 1304. Portion 1300 may represent one of system 100 of FIG. 1, system 800 of FIG. 8, system 900 of FIG. 9, and system 1200 of FIG. 12.

Optional vertical support 1322 is shown as a chain (e.g., a light weight metal or plastic chain) that hangs from top horizontal beam 1304 and provides lift to additional horizontal beam 1306(1) at point 1324, and lift to additional horizontal beam 1306(2) at point 1326. Such support allows horizontal beams 1306 to be less sturdy that top horizontal beam 1304, thereby saving on cost and weight. Optional vertical support 1322 may be utilized between backing plates 1308, as required to minimize sag in additional horizontal beams 1306 and without obscuring solar energy incident on solar collectors 1312 supported by backing plates 1308.

In an alternate embodiment, backing plates 108, 808, 908, and 1208 and/or solar collectors 112, 812, 912 and 1212 of FIGS. 1, 8, 9 and 12, respectively, include a mechanism and/or counter-balance weight that angles solar collectors 112, 812, 912 and 1212 upward above the horizon to provide an improved angle of incidence of sunlight onto solar collectors 112, 812, 912 and 1212. Similarly, the mechanism and/or counter-balance may also be used with backing plates 1008 of partial system 1000, FIG. 10 and backing plate 1108 of FIG. 11.

In another embodiment, solar collectors 112, 812, 912, 1012 and 1212 include an all absorbing (similar to anti-reflection) layer that increases performance of solar collectors 112, 812, 912, 1012 and 1212 when hanging vertically.

Although one or two poles are shown in the examples illustrated, more or fewer poles may be used without departing from the scope hereof. Although one, two or three horizontal beams are shown in the illustrations, more or fewer beams may be used without departing from the scope hereof.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. Solar capture mounting system, comprising:
   two vertical poles, each supported directly by the ground;
   a plurality of horizontal beams mounted to the vertical poles, the plurality of horizontal beams being collectively formed from a single cable threaded through holes in the two vertical poles, the holes passing through the entirety of the vertical poles, the single cable forming vertical portions between two of the plurality of horizontal beams at an outer surface of the vertical pole opposite a plurality of backing plates; and
   the plurality of backing plates each hanging, at a top edge of each backing plate, from and underneath a respective one of the plurality of horizontal beams, each backing plate supporting at least one solar cell and being responsive to wind pressure to pivot about the horizontal beam wherein a bottom edge of a first backing plate of the plurality of backing plates is free to move independently from a bottom edge of a second adjacent backing plate of the plurality of backing plates such that the first backing plate is capable of swinging independently of the second adjacent backing plate in response to the wind pressure.

2. The solar capture mounting system of claim 1, wherein at least one of the pivoting backing plates reduces wind resistance of the solar capture mounting system.

3. The solar capture mounting system of claim 2, wherein at least one of the pivoting backing plates reduces the probability of damage resulting from wind.

4. The solar capture mounting system of claim 1, at least one of the vertical poles and the plurality of horizontal beams providing support for electrical connectivity to the at least one solar cell.

5. The solar capture mounting system of claim 1, further comprising an additional horizontal beam, wherein the additional horizontal beam comprises a rod.

6. The solar capture mounting system of claim 1, wherein the backing plates hanging from each of the plurality of horizontal beams forms at least a two by two array of backing plates.

7. The solar capture mounting system of claim 1, the plurality of horizontal beams being mounted substantially perpendicular to the vertical poles.

8. A photovoltaic mounting system, comprising:
   a first vertical pole and an opposing second vertical pole, each vertical pole being supported directly by the ground;
   a plurality of horizontal beams mounted to and between each of the first and second vertical poles, the horizontal beams being collectively formed from a single cable thread through holes in the first and second vertical poles, the holes passing through the entirety of the first and second vertical poles, the single cable forming vertical portions between two of the plurality of horizontal beams at an outer surface of the vertical pole opposite a plurality of backing plates; and
   each of the plurality of backing plates mechanically coupled at a top edge of each backing plate to a respective one of the horizontal beams and pivoted to move in an arc substantially around the respective horizontal beam;
   wherein a bottom edge of a first backing plate of the plurality of backing plates is free to move independently from a bottom edge of a second adjacent backing plate of the plurality of backing plates such that the first backing plate is capable of swinging independently of the second adjacent backing plate in response to wind pressure; and
   wherein each backing plate hangs underneath the respective horizontal beam and supports at least one solar cell.

9. The photovoltaic mounting system of claim 8, further comprising an additional horizontal beam mounted at the top of the first and second vertical poles, wherein the additional horizontal beam comprises an "I" beam formed of carbon fiber.

10. The photovoltaic mounting system of claim 8, further comprising an additional horizontal beam mounted at the top of the first and second vertical poles, wherein the additional horizontal beam comprises a tube.

11. The photovoltaic mounting system of claim 8, each backing plate being pivotally supported by at least two stainless steel rings;
    wherein the at least two stainless steel rings are mounted through the at least one backing plate and around one of the horizontal beams.

12. The photovoltaic mounting system of claim 8, each backing plate being pivotally supported by at least two hinges.

13. The photovoltaic mounting system of claim 8, wherein the totality of backing plates is configured in an at least two by two array.

14. The photovoltaic mounting system of claim 8, wherein at least one of the backing plates comprises a plastic sheet with at least two mounting holes along the top edge.

15. The photovoltaic mounting system of claim 8, wherein at least one of the backing plates comprises a weight positioned at the back side and away from the plane of the backing plate such that the at least one solar cell is angled above the horizon.

16. The photovoltaic mounting system of claim 8, wherein at least one of the backing plates comprises a spring mechanism to position the plate at an angle relative to vertical.

17. The photovoltaic mounting system of claim 8, wherein the at least one backing plate moves when blown by the wind to reduce the area of the backing plate presented towards the wind.

18. A photovoltaic mounting system, comprising:
a first vertical pole and a second opposing vertical pole, each vertical pole being supported directly by the ground;
a plurality of horizontal cross beams between the first and second vertical poles, the plurality of horizontal cross beams being formed from a single cable thread through holes in the first and second opposing vertical poles the holes passing through the entirety of the first and second vertical poles, the single cable forming vertical portions between two of the plurality of horizontal beams at an outer surface of the vertical pole opposite a plurality of backing plates; and
each of the horizontal cross beams having a plurality of the backing plates hanging, at a top edge of each backing plate, therefrom, each backing plate pivotable to move in an arc substantially around the respective horizontal cross beam in response to pressure from wind;
wherein a bottom edge of a first backing plate of the plurality of backing plates is free to move independently from a bottom edge of a second adjacent backing plate of the plurality of backing plates such that the first backing plate is capable of swinging independently of the second adjacent backing plate in response to the pressure from wind;
wherein each backing plate hangs underneath the respective horizontal cross beam and supports at least one solar cell.

19. The photovoltaic mounting system of claim 18, wherein the plurality of horizontal cross beams further comprises a top horizontal cross beam mounted atop of the first and second vertical poles.

20. The photovoltaic mounting system of claim 18, further comprising at least one automatic tensioning system for maintaining tension on the cable.

21. A method for mounting solar cells, comprising:
fixedly positioning a first pole substantially vertical;
fixedly positioning a second pole apart from the first pole such that a plane defined by the first and second poles is substantially perpendicular to a direction toward the sun;
threading a single cable through holes in the first and second poles to form a plurality of horizontal support beams from the first pole to the second pole the holes passing through the entirety of the first and second vertical poles, the single cable forming vertical portions between two of the plurality of horizontal support beams at an outer surface of the vertical pole opposite a plurality of backing plates;
hanging a plurality of the backing plates from the horizontal support beams at a top edge of each backing plate, wherein each backing plate hangs underneath the horizontal support beams; and
attaching at least one solar cell to each backing plate;
wherein a bottom edge of a first backing plate of the plurality of backing plates is free to move independently from a bottom edge of a second adjacent backing plate of the plurality of backing plates such that the first backing plate is capable of swinging independently of the second adjacent backing plate in response to wind pressure.

22. The photovoltaic mounting system of claim 1, further comprising at least one automatic tensioning system for maintaining tension on the cable.

23. The photovoltaic mounting system of claim 8, further comprising at least one automatic tensioning system for maintaining tension on the cable.

* * * * *